US012682450B2

(12) United States Patent
Corti et al.

(10) Patent No.: US 12,682,450 B2
(45) Date of Patent: Jul. 14, 2026

(54) SYSTEM AND METHOD OF DETECTION AND IDENTIFICATION OF CROPS AND WEEDS

(71) Applicants: PLANTIUM S.A., Villa Consitición (AR); Jorge A. Gentili, Villa Consitición (AR)

(72) Inventors: Cintia Corti, Alcorta (AR); Nicolás Pellejero, Rosario (AR)

(73) Assignees: PLANTIUM S.A., Prov. de Santa Fe (AR); GENTILI. JORGE A., Prov. de Santa Fe (AR)

( * ) Notice: Subject to any disclaimer, the term of this patent is extended or adjusted under 35 U.S.C. 154(b) by 695 days.

(21) Appl. No.: 17/909,672

(22) PCT Filed: Mar. 5, 2020

(86) PCT No.: PCT/IB2020/051926

§ 371 (c)(1),
(2) Date: Sep. 6, 2022

(87) PCT Pub. No.: WO2021/176254

PCT Pub. Date: Sep. 10, 2021

(65) Prior Publication Data

US 2023/0117884 A1 Apr. 20, 2023

(51) Int. Cl.
*G06T 7/00* (2017.01)
*A01M 7/00* (2006.01)

(52) U.S. Cl.
CPC ......... *G06T 7/0012* (2013.01); *A01M 7/0089* (2013.01); *G06T 2207/10048* (2013.01);
(Continued)

(58) Field of Classification Search
CPC ......... G06T 7/0012; G06T 2207/10048; G06T 2207/20208; G06T 2207/30188;
(Continued)

(56) References Cited

U.S. PATENT DOCUMENTS 5,296,702 A 3/1994 Beck et al.
10,106,153 B1 * 10/2018 Xiao ...................... B62D 15/02
(Continued)

FOREIGN PATENT DOCUMENTS

WO WO2017/178666 A1 10/2017

*Primary Examiner* — Andrew M Moyer
*Assistant Examiner* — Ahmed A Nasher
(74) *Attorney, Agent, or Firm* — MUNCY, GEISSLER, OLDS & LOWE, P.C.

(57) ABSTRACT

A system for detecting and identifying plant species in an agricultural field that allows to act on them, which comprises at least one camera that includes a lens, a bandpass filter and an image sensor; a GPS unit; and at least one data processing unit comprising data storage means and in data communication with the at least one camera and with the GPS unit, wherein each data processing unit comprises a system for calibrating the cameras, where the cameras capture and send images to the data processing unit, where each data processing unit is configured to autonomously detect and identify plant species, discriminating between crops, weeds and soil, based on the images that it receives and make decisions as detected and identified, and where each data processing unit geolocates the detected plant species. A method that uses the plant species detection and identification system of the present invention to detect and identify plant species in an agricultural field.

10 Claims, 9 Drawing Sheets

(52) U.S. Cl.
CPC ............... *G06T 2207/20208* (2013.01); *G06T 2207/30188* (2013.01)

(58) Field of Classification Search
CPC .. A01M 7/0089; G01N 33/0098; G06F 16/55; G06F 16/583; G06F 16/532
See application file for complete search history.

(56) References Cited

U.S. PATENT DOCUMENTS

| | | | |
|---|---|---|---|
| 11,074,447 B1 * | 7/2021 | Fox ...................... | G05D 1/0094 |
| 11,560,680 B2 * | 1/2023 | Baßfeld ................. | G05B 15/02 |
| 2014/0180549 A1 * | 6/2014 | Siemens ............... | A01B 39/18 |
| | | | 701/50 |
| 2015/0245565 A1 | 9/2015 | Pilgrim et al. | |
| 2016/0255778 A1 | 9/2016 | Redden et al. | |
| 2018/0330166 A1 | 11/2018 | Redden et al. | |
| 2019/0037207 A1 * | 1/2019 | Brockers .............. | H04N 13/117 |
| 2019/0150357 A1 * | 5/2019 | Wu ........................ | H04N 7/188 |
| 2019/0362146 A1 * | 11/2019 | Polzounov ............... | G06T 7/10 |
| 2020/0045953 A1 * | 2/2020 | Serrat ................. | A01M 7/0042 |
| 2021/0176979 A1 * | 6/2021 | Schlemmer ........... | A01M 21/04 |
| 2021/0201025 A1 * | 7/2021 | Ogawa ..................... | G06T 5/50 |

* cited by examiner

TRAINING STEP

IDENTIFICATION STEP

1 Cost (training)  2 Efficacy (validation) 3 Cost (validation)

SYSTEM AND METHOD OF DETECTION AND IDENTIFICATION OF CROPS AND WEEDS

FIELD OF THE INVENTION

The present invention relates to the technical field of precision agriculture. More particularly, the present invention is related to a crop and weed detection and identification system and method that allow the crop and weed to be detected, identified, and geolocated, in addition to being able to act on them depending on the activity being carried out in an agricultural field.

BACKGROUND OF THE INVENTION

It is well known in the technical field related to agriculture how in the last decades new technologies have been incorporated in this field to arrive at what is known today as precision agriculture. This expression refers to the incorporation and application of technologies such as satellite geolocation, management software, electronics, vision and artificial intelligence software, among many others. The introduction of each of these technologies inevitably results in better, more sustainable, faster, cost-effective and more efficient agriculture.

In particular, the introduction of artificial intelligence and vision allows automating decision making. An agricultural machine that incorporates these technologies could detect and distinguish different plant species, geolocate them, and make decisions to act on them or not, among many other possible functions. This is how in recent years convolutional neural networks have begun to be applied in the technical field corresponding to precision agriculture, which are a particular form of highly sophisticated artificial intelligence whose use is very effective for the detection of plants.

There are multiple patent documents related to the detection of plant species in the art, such as patent application WO 2017/178666 A1 to Diego H. Perez Roca that discloses a set of autonomous devices and a method for detection and identification of plant species in an agricultural crop for the selective application of agrochemicals through the use of convolutional neural networks.

Said method, by making it possible to distinguish different plant species, necessarily requires obtaining data from all the existing plant species in sufficient quantity to train the convolutional neural networks, which represents a greater cost of time for both network training and processing to detect plant species, and a higher cost of necessary resources since in order to carry out the detection operation in the shortest possible time and, therefore, more efficiently, a powerful processing unit would be necessary and, consequently, of high cost.

Furthermore, patent application WO'666 does not allow the mapping of weeds and crops by geolocating them.

Patent application US 2018/0330166 A1 in the name of Blue River Technology discloses a plant treatment platform that uses a plant detection model to detect and identify plants in images captured by a camera on the mobile treatment platform as it moves through a crop field. Said plant detection model is configured to generate bounding boxes that enclose portions of the images that are identified as containing different plants. In addition, this plant detection model uses deep learning neural networks to detect plants.

In this document, the white balance of the images once captured is modified, which generates a loss of color resolution, since they have already been digitalized. Likewise, there is no mention of the use of filters in the cameras to improve the contrast between the plant species and the soil or other elements normally present in a field for planting crops.

The use of bounding boxes adds complexity to the algorithm since, to detect an object, in this case a plant, the algorithm must first delimit it in a bounding box, so the cost function that must train the algorithm is more complex. In addition, difficult cases are generated when the plants are close or overlapping.

Tagging with bounding boxes is inefficient as it requires many hours of tagging work in relation to the volume of data processed. Likewise, this document does not contemplate the realization of crop and/or weed maps that are geolocated as the plant detection platform advances over a crop field.

Patent application US 2016/0255778 A1 to Blue River Technology discloses a precision agriculture modular system that includes different modules coupled to a frame so that each module can operate in a respective row. Also, each module has corresponding sensors, an actuator to perform an action on the crop and a processing unit to make decisions about the action to be performed.

The fact that each module has its respective processing unit results in unnecessary and avoidable costs.

Patent U.S. Pat. No. 5,296,702 A to Patchen California discloses a device and method for detecting weeds in a crop by two light sources at different wavelengths.

Photodetectors are used in said patent, by means of which it can only be determined if the spectral response obtained by them in the detection area exceeds a certain threshold condition established as a base. The method proposed in this patent depends on the distribution and health of the crop to discriminate between crop and weed, since it assumes that the "base", that is, the response of the crop is going to remain constant, determining that there is a weed if it is detected an increase from that base. On the other hand, it does not use neural networks or allow the geolocation of plants and weeds and the creation of multilayer maps.

Finally, patent application US 2015/245565 A1 to Bob Pilgrim, Harold Shane Sanford and Clark Duncan, discloses a method and device for detecting plants and selectively applying agricultural products.

The device of said document uses one or more image receiving devices and one or more light emitting devices. Also, it includes a double band filter to filter images and it can include a GPS to determine the position of a plant.

It is also indicated that the position of the plants is used as a criterion to determine if weeds or crops are concerned. This is based on the assumption that the crop will be planted at a uniform distance and that there will be no weeds very close to any crop plant, which means that the most damaging cases in agronomic terms that are weeds very close to the crop are not detected if the weed has the same leaf shape as the crop. Also, the method by which the leaf shapes of the crop and weeds are compared is not explained in said patent document, therefore the precision of the method cannot be estimated.

Consequently, there is a need for a system and method that allow the detection and identification of plant species and the decision-making on them in an efficient, reliable way and with a minimum of resources. Likewise, allowing obtaining maps where plant species can be geolocated.

BRIEF DESCRIPTION OF THE INVENTION

Based on the above considerations, the present invention provides a system and method that allow the detection and identification of plant species in an agricultural field, being able to easily differentiate between crop, weed and soil; and making decisions about them, allowing, for example, selective spraying of agrochemicals, efficiently, reliably and with a minimum of resources. It also allows the generation of multilayer maps that provide useful information about the agricultural field. On the other hand, said detection system and method are easily adaptable to different equipment or agricultural vehicles with different functions to perform.

Consequently, an object of the present invention is a system of detection and identification of plant species in an agricultural field that allows acting on them, comprising:

at least one camera comprising a lens, a bandpass filter and an image sensor;
a GPS unit; and
at least one data processing unit comprising data storage means and in data communication with the at least one camera and with the GPS unit,
wherein each of the at least one data processing unit comprises a camera calibration system,
wherein each of the at least one camera captures and sends images to the at least one data processing unit,
wherein each of the at least one data processing unit is configured to autonomously detect and identify plant species, discriminating between crops, weeds and soil, based on the images it receives and to make decisions as detected and identified, and
wherein each of the at least one data processing unit geolocates the detected plant species.

In an embodiment of the present invention, the detection and identification system comprises six cameras.

In an embodiment of the present invention, each of the at least one camera is a high dynamic range camera.

In an embodiment of the present invention, the bandpass filter allows its respective camera to receive electromagnetic radiation with wavelengths corresponding to red light and near infrared.

In an embodiment of the present invention, the detection and identification system further comprises an inertial measurement unit for each of the at least one camera.

In an embodiment of the present invention, the inertial measurement unit is rigidly attached to its respective camera.

In an embodiment of the present invention, the detection and identification system comprises a lighting source for each of the at least one camera.

In an embodiment of the present invention, the light source is positioned parallel to a respective camera.

In one embodiment of the present invention, the light source is an LED light source.

In an embodiment of the present invention, the detection and identification system comprises a data processing unit every six or fewer cameras.

In an embodiment of the present invention, each of the at least one data processing unit, in order to achieve detection and identification of plant species, employs artificial intelligence algorithms and deep learning algorithms comprising convolutional neural networks, discriminating between crops, weeds and soil.

In an embodiment of the present invention, each of the at least one data processing unit, in order to achieve the geolocation of the plant species, uses geolocation algorithms.

In one embodiment of the present invention, the plant species detection and identification system is mounted on an agricultural vehicle.

In a preferred embodiment of the present invention, the agricultural vehicle is selected from an agrochemical spraying vehicle, a vehicle pulling a trailed sprayer, or an electric robot for agricultural operations.

In an embodiment of the present invention, each of the at least one data processing unit is in data communication with a valve controller so as to independently operate a valve assembly.

In one embodiment of the present invention, the detection and identification system is mounted on a spray boom.

In a preferred embodiment of the present invention, each of the at least one camera is positioned at a height between 50 cm and 180 cm with respect to the ground, preferably between 80 cm and 160 cm and more preferably at 140 cm.

In a preferred embodiment of the present invention, each of the at least one camera has a tilt angle between 40 and 60 degrees, preferably 50 degrees, towards the ground and forward of, for example, a sprayer vehicle.

In a preferred embodiment of the present invention, the detection and identification system comprises at least two cameras spaced apart between 0.5 m and 5 m, preferably between 1 m and 3 m, and more preferably 2 m.

In a preferred embodiment of the present invention, the image sensor of each of the at least one camera allows images with a wide aspect ratio to be captured.

Another object of the present invention is a method that uses the detection and identification system of plant species of the present invention to detect and identify plant species in an agricultural field, wherein said method comprises the following steps:

-a sensing step, where an image or frame of the soil that can contain living or dead plant species is captured through a camera, and wherein a data processing unit receives data from the GPS unit, and applies in real time and iteratively, configurations to each camera through the calibration system,
an image processing step, where the data processing unit performs any type of necessary subsequent correction to image capture, and separates the image into patches or rectangular portions so as to divide the image into a smaller size frame grid,
a detection and identification step, where the content of each patch is detected and identified by the data processing unit, thus achieving detection and identification of plant species,
a decision step, where the plant species detected and identified in the previous step are geolocated through the data processing unit and decisions are made regarding the way to act on said detected plant species, and
an application step, where the data processing unit determines an action with respect to the detected and identified plant species, determining when, where and for how long said action must be carried out.

In a preferred embodiment of the present invention, the method is performed by an agrochemical spraying vehicle so that the application step is performed by valves which apply or not agrochemicals on the detected and identified plant species.

In a preferred embodiment of the present invention, the camera is a high dynamic range camera.

In one embodiment of the present invention, the data processing unit receives data from an inertial measurement unit.

In an embodiment of the present invention, the method detection and identification step employs deep learning algorithms for the detection and identification of plant species.

5

DETAILED DESCRIPTION OF THE INVENTION

The system and method of the present invention will now be described in detail with reference to FIGS. 1 to 10, which illustrate, by way of example, embodiments of the invention and the different elements thereof.

In each of the figures the same numerical references are used to designate similar or equal elements of the detection and identification system of the present invention.

Figure 1:
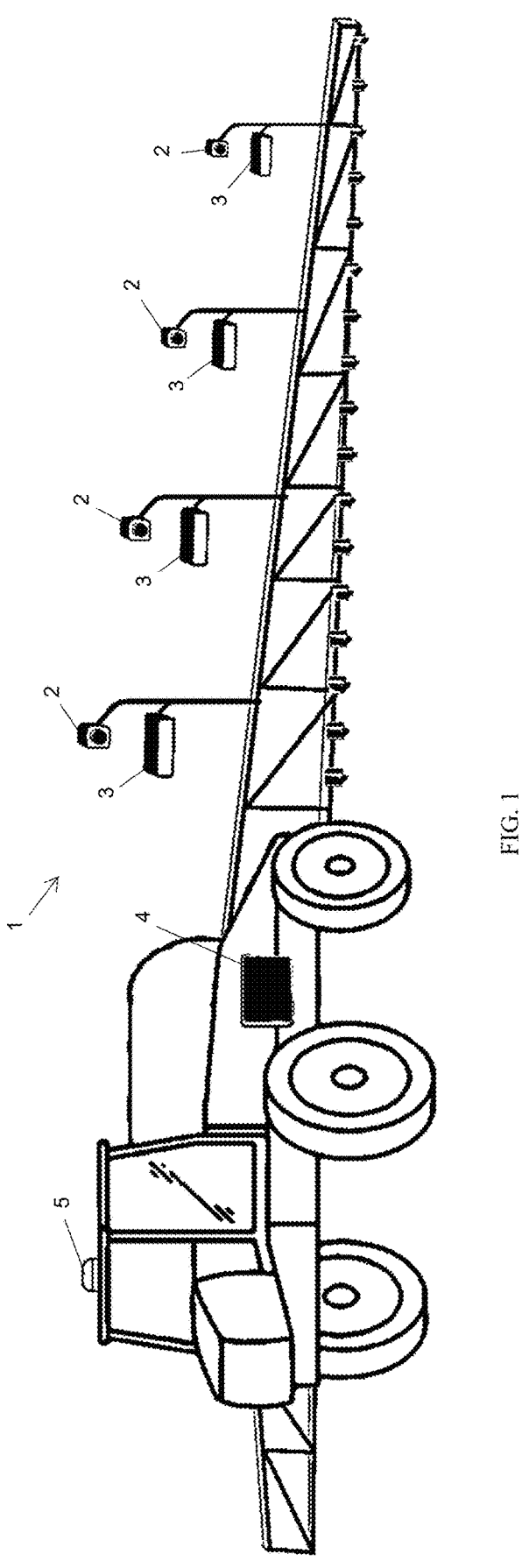
FIG. 1 shows an embodiment of the detection and identification system of the present invention incorporated or mounted on a spray boom and an agricultural vehicle which pulls said spray boom.

Referring to FIG. 1, an embodiment of the detection and identification system 1 of the present invention can be seen incorporated or mounted on a spray boom and an agricultural vehicle which carries said spray boom. Said detection and identification system 1 comprises a plurality of cameras 2, a plurality of lighting sources 3, with one lighting source 3 for each camera 2, a data processing unit 4 that is in data communication with the plurality of cameras 2 and the plurality of lighting sources 3, and which is in data communication with a GPS unit 5. Said detection and identification system 1 can also be used to command spray valves, as will be seen later. It should be noted that, although cameras and lighting sources are not shown on the other side of the boom, these components, in this case, are incorporated throughout the boom, spaced from each other and with reference to the ground at distances and angles that will be detailed later.

In said embodiment, each of the cameras 2 comprises an inertial measurement unit (IMU) and an image sensor responsible for transforming the image obtained into a series of electrical signals that will give rise to the digital image that will be further processed as will be seen later, through the data processing unit 4. It should be noted that each of the cameras 2 may not have an inertial measurement unit.

Figure 2:
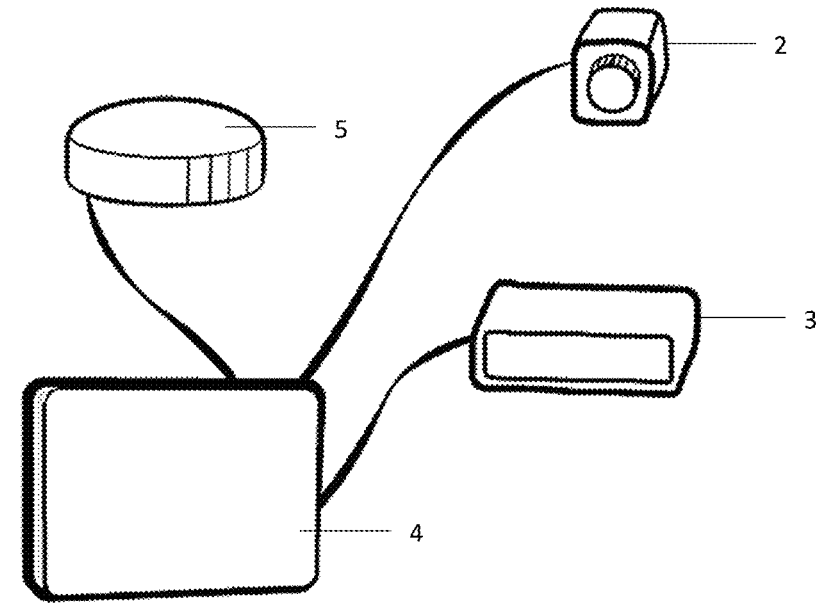
FIG. 2 shows an example embodiment of the detection and identification system similar to that of FIG. 1 but in this case the detection and identification system is shown separately and not applied in an agricultural vehicle and spray boom.

Referring to FIG. 2 an example embodiment of the detection and identification system 1 similar to that shown in FIG. 1 can be seen but in this case the detection and identification system 1 is shown separately and not applied in an agricultural vehicle and spray boom. Said FIG. 2 is shown only to clarify how the different components of the detection and identification system of the present invention are related to each other, showing a single camera 2 and a lighting source 3, both camera 2 and the lighting source being 3 in data communication with the data processing unit 4 through respective cables which also serve as power cables. Said data processing unit 4 comprises data storage means and is, in turn, in data communication with a GPS unit 5 so as to be able to georeference the detections of plant species that are carried out as will be described below.

Figure 3:
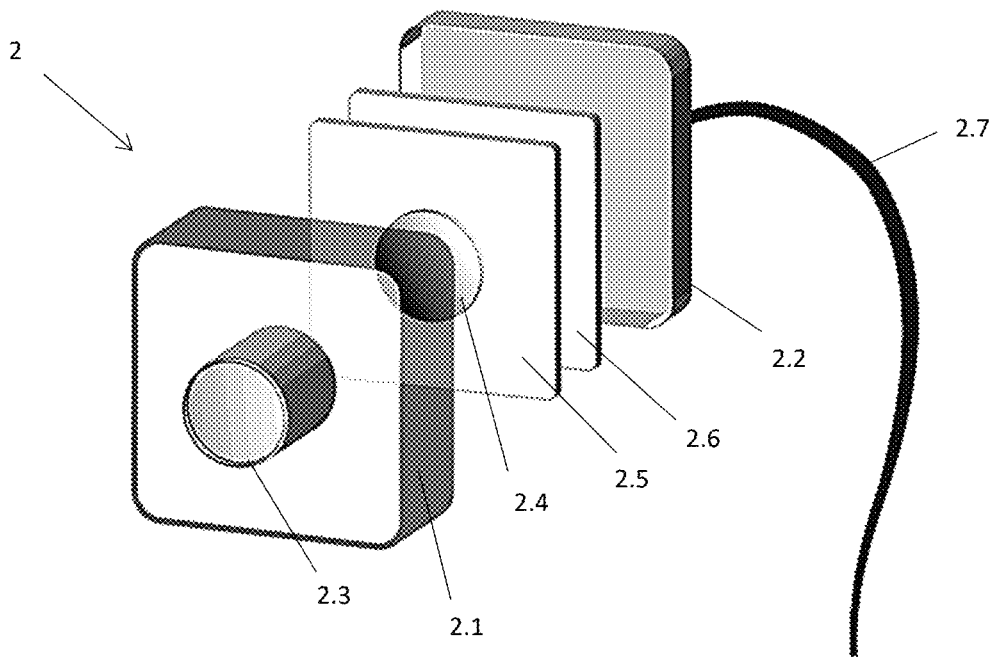
FIG. 3 shows an exploded view of a preferred embodiment of the cameras used by the detection and identification system of the present invention.

Referring to FIG. 3, an exploded view of a preferred embodiment of the cameras 2 used by the detection and identification system of the present invention can be seen. Each of said cameras 2 comprises a cabinet formed by a front part 2.1 of the cabinet and a rear part 2.2 of the cabinet, wherein said cabinet comprises a lens 2.3 in the front part 2.1 of the cabinet; a bandpass filter 2.4, a plate with the image sensor 2.5, and a plate with the inertial measurement unit 2.6 inside the cabinet; and a power cable 2.7 in data communication with the processing unit. As mentioned above, camera 2 may not have the plate with the inertial measurement unit 2.6, the incorporation of said inertial measurement unit in each of the cameras being optional.

The lens 2.3 is selected according to the user's requirements during the use of the detection and identification system of the present invention. The components of camera 2 will be described in greater detail later.

Figure 4:
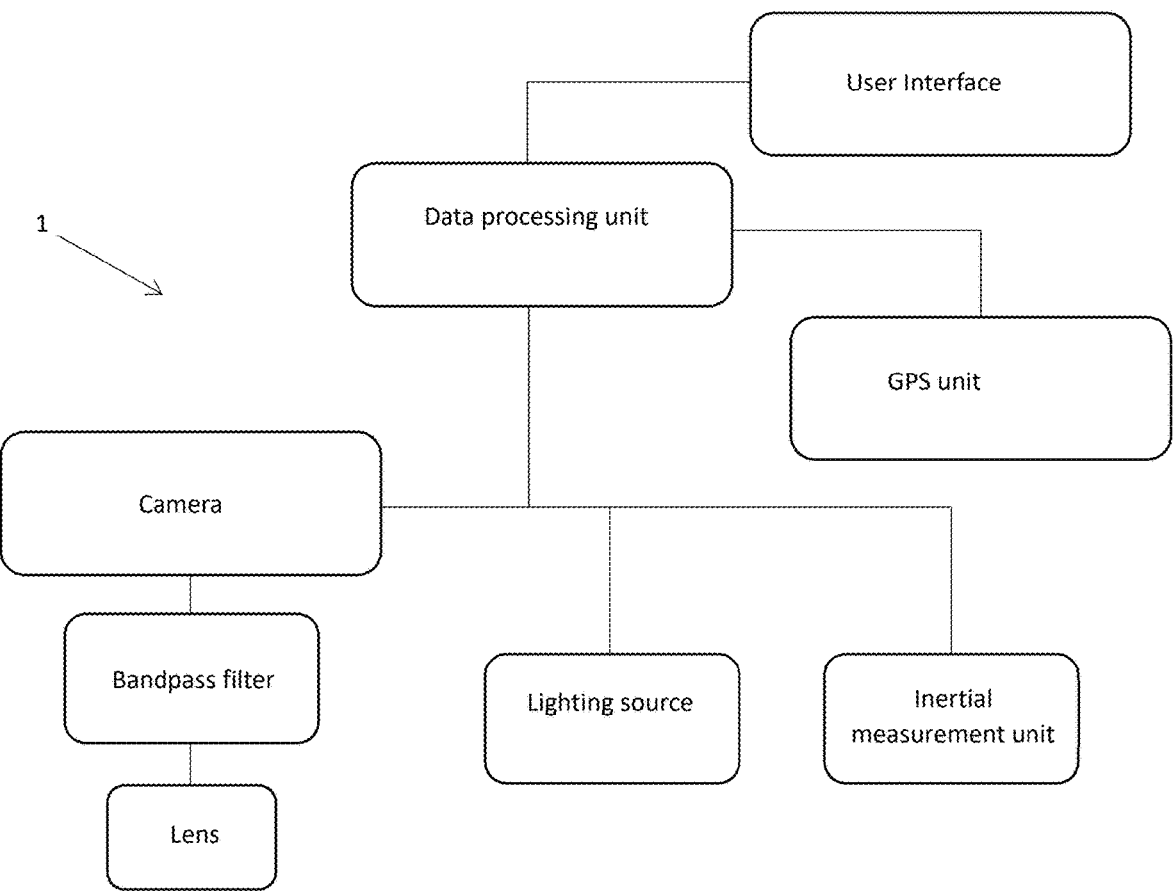
FIG. 4 shows a schematic image of an embodiment of the detection and identification system of the present invention.

Referring to FIG. 4, a schematic image of an embodiment of the detection and identification system 1 of the present invention can be seen, which comprises a camera, wherein said camera comprises a lens, a bandpass filter and an image sensor; a lighting source and an inertial measurement unit, said inertial measurement unit also being able to be inside or outside the camera and there being an inertial measurement unit for each camera. Also, the camera is in data communication with a data processing unit which, in turn, is in data communication with a GPS unit. Said data processing unit comprises data storage means and is also in data communication with the lighting source and the inertial measurement unit. Furthermore, the data processing unit is in data communication with a user interface so that all the collected information can be represented in said user interface.

The inertial measurement unit, whether inside or outside the camera, is rigidly attached to the camera so as to, for example, measure the position of the camera.

It should be noted that, although FIGS. 2 and 4 show a data processing unit in data communication with a single camera, said FIGS. 2 and 4 are only by way of example and the data processing unit from the detection and identification system of the present invention is preferably in data communication with two or more cameras, lighting sources and inertial measurement units, so as to cover the total working width, as will be seen below.

Figure 5:
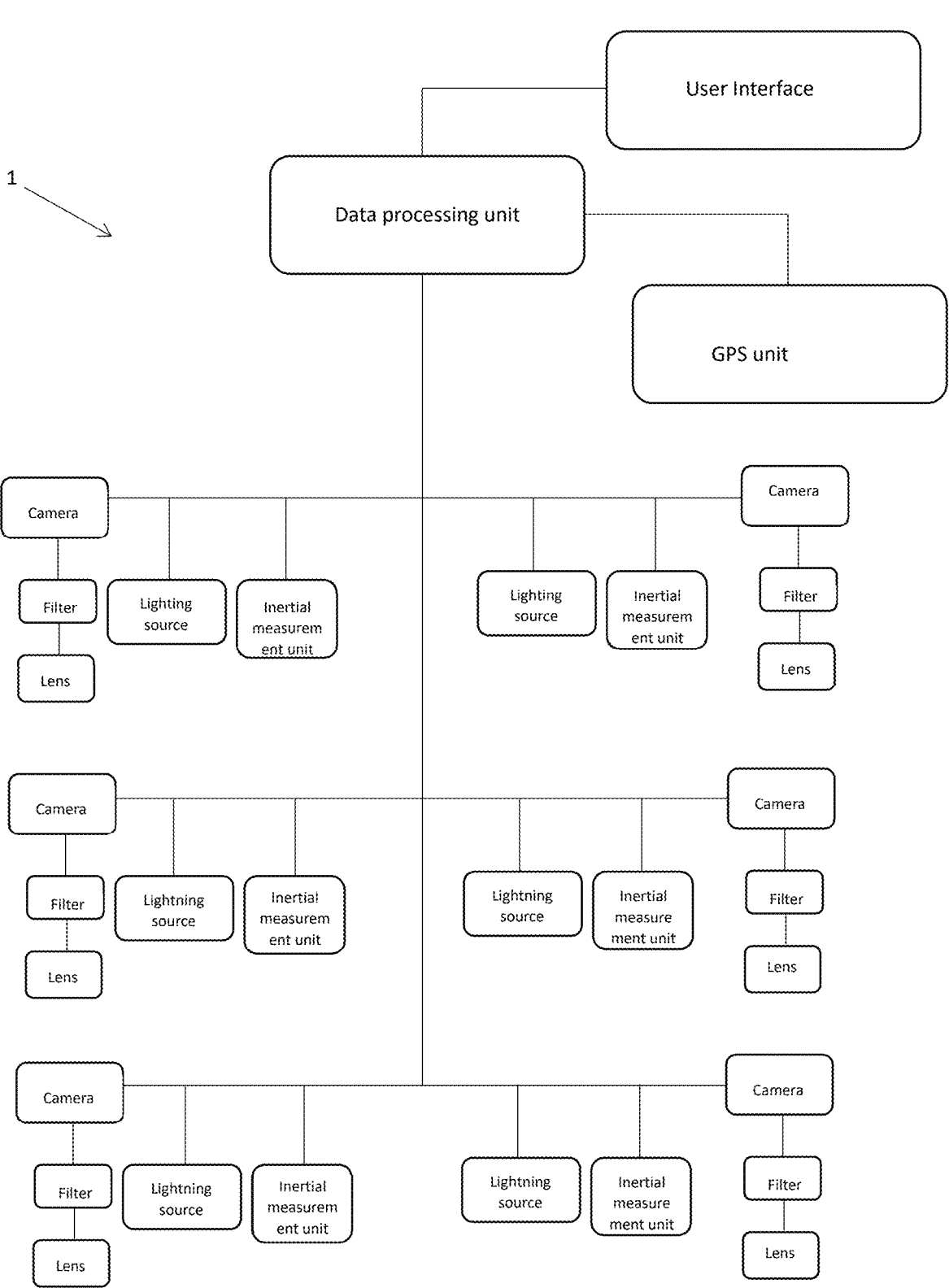
FIG. 5 shows a schematic image of a preferred embodiment of the detection and identification system comprising a data processing unit in data communication with six cameras.

Referring to FIG. 5 a schematic image of a preferred embodiment of the present invention can be seen similar to the embodiment of FIG. 4 but with the difference that the detection and identification system 1 comprises a data processing unit in data communication with a plurality of cameras comprising six cameras, wherein each camera is preferably a high dynamic range camera. It should be noted that another number of cameras could be used, such as 2, 3, 4, 5 cameras, or more than 6 cameras in data communication with the same data processing unit, provided that such processing unit allows it.

In a preferred embodiment of the present invention one data processing unit is used for every six cameras, so that each data processing unit is in data communication with a maximum of six cameras. Thus, in the case of using, for example, twelve cameras to cover the total working width, at least two data processing units would be needed in data communication with said cameras.

In an embodiment of the present invention, the cabinet of each camera comprises an inertial measurement unit, a lighting source, a data processing unit and components necessary for the actuation of valves or actuators, in addition to the camera components such as the image sensor, bandpass filter and lens. In this embodiment, there is a data processing unit per camera or image sensor.

Next, each of the components of the detection and identification system of the present invention and the mode of operation thereof will be detailed. Such in-depth descriptions are applicable to each of the embodiments described above.

The bandpass filter used for each camera is a filter that allows bands of electromagnetic waves to reach the image sensor of the camera whose wavelengths range from approximately 620 nm, that is, from the red of the visible spectrum, to approximately 2500 nm belonging to the near infrared (NIR). In a preferred embodiment the wavelengths range from 620 nm to 700 nm and from 780 nm to 900 nm. In this way, the bandpass filter improves the perception of living or dead plant species with respect to the soil, thus taking advantage of the absorption and rejection of infrared and red light corresponding to each group to be distinguished (see "Strategy for the Development of a Smart NDVI Camera System for Outdoor Plant Detection and Agricultural Embedded Systems"). For its part, the lens choice allows objects to be observed at a certain distance from the camera with a certain resolution and sharpness.

As previously mentioned, one light source is placed for each camera, where said light source is preferably an LED light source that is placed parallel to its corresponding camera. It should be noted that the detection and identification system of the present invention can use natural lighting whenever the weather conditions allow it. Thus, the incorporation of the lighting source into the detection and identification system is optional and depends on whether the detection and identification system is used at night. In other words, the light source is only required in the night setup.

In an embodiment of the present invention, the detection and identification system of the present invention can be mounted on an agricultural vehicle and on a spray boom, as shown in FIG. 1. Additionally, the detection and identification system can be incorporated into or mounted on agricultural vehicles such as an agrochemical spraying vehicle, a vehicle pulling a trailed sprayer, or an electric robot. In one embodiment of the present invention the detection and identification system is mounted on a spray boom of a spray vehicle or on a trailed sprayer.

In case the detection and identification system is mounted either on a spray vehicle, trailed sprayer, spray boom or other agricultural vehicle or component, and a plurality of cameras are used for the detection of plant species, the spacing between said cameras will be determined according to the precision to be achieved and the type of detection, and may be, in an exemplary embodiment, between 0.5 m and 5 m, preferably between 1 m and 3 m, and more preferably 2 m to achieve a wide field of view of the terrain over which the farm vehicle is traveling.

In case the detection and identification system of plant species is mounted either on an agrochemical spraying vehicle, trailed sprayer, spray boom or other agricultural vehicle or component, the cameras are incorporated in such a way as to meet a height between 50 cm and 180 cm from the ground, preferably between 80 cm and 160 cm, and more preferably 140 cm, and inclined at an angle of inclination between 40 and 60 degrees, preferably 50 degrees, so that the cameras are oriented to the ground and forward of, for example, an agricultural vehicle, the forward direction being defined by the forward direction of for example said agricultural vehicle. In particular, the 50 degree inclination angle favors the detection of plant species for the selected camera and lens and the use of artificial lighting at night using the LED light source.

It should be noted that the ranges of values just mentioned in relation to the spacing between the cameras, the height and angle of inclination thereof, are only preferred embodiments and should not be considered as limiting since values outside of such ranges may be used as necessary. Also, depending on the requirements of precision, cost, among others, a lens model and certain geometry for the cameras may be selected, with the geometry being the height of the cameras and the spacing between them, which allow observing plant species with the necessary resolution. For example, if a certain resolution is desired with a certain lens model, the cameras should be placed at a certain height and spacing from each other in order to achieve said determined resolution, the spacing being such that it involves few cameras. In other words, the resolution and cost required determine the choice of lens and the height and spacing between the cameras.

The cameras are responsible for capturing and sending images to the data processing unit so that it can autonomously detect and identify plant species, discriminating between crops, weeds and soil, based on the images it receives, and make decisions as detected, such as acting on weeds or not, among other possible actions. It also allows the geolocation of the plant species that it detects by being in data communication with the GPS unit. This will be described in more detail below.

The cameras, for example, high dynamic range cameras, cover each one, for example, between 1 m and 5 m of working width according to the precision to be achieved and the type of detection to be performed. This variation is due to the fact that it is possible to work with lenses with different characteristics regarding their vision field according to which the requirement of precision versus cost applies, where the choice of the model of lenses to be used modifies the height geometry of the cameras and spacing between them, giving versatility to the detection and identification system.

The cameras have image sensors selected so as to allow capturing images with a very wide aspect ratio, which compared to a standard aspect ratio allows obtaining better resolution in the horizontal dimension for a given working width. For the purposes of the present invention, the "aspect ratio" of an image is understood to be the ratio between the width and the height of said image, therefore, a very wide aspect ratio implies that the captured image has a width greater than its height. This is useful for the detection of plant species because these, be they crops or weeds, are on the ground, that is, on a certain plane and, taking into account their size and the required working speed, the distance of the vehicle is limited to which is of interest to sense plant species. On the other hand, it is very useful to improve horizontal resolution within the stipulated working width, since plant species that are at a suitable distance from the vehicle for detection can be detected with better resolution. In addition, the image sensors used in the cameras are preferably sensors with a dynamic range of at least 60 dB, preferably 120 dB, thanks to the use of the High Dynamic Range Imaging (HDR) mode that allows images to be captured with different values of exposure and gain and automatically compose them to obtain a good signal-to-noise ratio throughout the image when the scene captured by the camera has great variation in lighting levels.

The system of detection and identification of plant species when mounted either on a spraying vehicle, trailed sprayer, agrochemical spray boom or other agricultural vehicle or component, is capable of effectively discriminating between weeds, crops and soil in a way that that the spraying of agrochemicals is selective and precise, for example, ensuring the application of herbicides only on weeds. This is achieved through the data processing unit which is configured, as described above, to detect, and discriminate between crops, weeds and soil, based on the images it receives, autonomously and make decisions as detected.

Likewise, the data processing unit comprises geolocation algorithms that when receiving the images from the cameras and when the data processing unit is in data communication with the GPS unit and inertial measurement units, allow the geolocation of each of plant species detected as the spray vehicle progresses and, in turn, develop weed and crop maps that can be multi-layered and are highly useful for decision-making. In particular, the detection and identification system of the present invention allows generating a multi-layered map of the covered area, it can comprise weed maps (discriminated by family), maps of growth stages of both weeds and crops, damaged crop maps with possible diseases or pests.

The data processing unit, which is preferably a multi-core processor with graphics processing unit optimized for working with images and/or image sets, comprises a calibration system that is in data communication with a system of self-calibration in the cameras to manage said system of self-calibration. To do this, the calibration system of the processing unit includes exposure calibration algorithms and other camera settings depending on the light conditions existing in the field where the spraying vehicle is located, measured through the parameters of the same cameras. In this way, the self-calibration system of the cameras by means of the calibration system of the data processing unit allows a calibration of the images obtained by the cameras in terms of exposure values, gain, white balance, among other parameters.

It should be noted that the calibration of the physical parameters of the cameras, such as their intrinsic parameters (focal length of the camera, its center and its distortion coefficients), and its extrinsic parameters (position and angle of inclination) are performed during the manufacture thereof and/or assembly thereof, for example, in the agricultural vehicle or component where they will be used by the detection and identification system of the present invention. These intrinsic and extrinsic parameters are reported to the data processing unit so that it takes them into account when performing its corresponding functions. In this way, the data processing unit knows, for example, the position and orientation of each of the cameras with respect to the agricultural vehicle or component and the ground; and allows relating what is detected by the cameras to a real position on the ground.

It is necessary to clarify that some of said intrinsic and extrinsic parameters could be calibrated by the data processing unit.

In addition, the data processing unit is configured to detect, identify and discriminate between crops, weeds and soil since it contains software with artificial intelligence algorithms trained to detect live or dead plant species in real time and software with deep learning algorithms, comprising convolutional neural networks, previously trained to distinguish any specific crop or plant species, for example, soybeans, between weeds, soil, fallow and other elements normally present in a production field agricultural.

As described above, each camera has a bandpass filter specially designed to receive the frequencies related to red and infrared light and block the others. In one embodiment, the filter can have a frequency response such that it allows wavelengths to pass between 620 nm and 660 nm, and between 780 nm and 900 nm, corresponding to red and infrared light, respectively. It should be noted that the different receiving cells of the image sensors of each camera are designed to receive waves corresponding to green light, blue light and red light individually. They also receive infrared light unless a filter is placed on the lens to prevent this. Thus, by placing the bandpass before the camera image sensor, only infrared light will be received in the cells prepared to receive green and blue, and red and infrared light will be received in the cells prepared to receive red light. In this way, it is possible to sense living plant species with more contrast with respect to dead plant species and the soil than if the bandpass filter is not used (Strategy for the Development of a Smart NDVI Camera System for Outdoor Plant Detection and Agricultural Embedded Systems).

Likewise, as described above, each camera of the detection and identification system of the present invention may also have a lighting source which may be an LED lighting source for night use, specially designed to emit red light and infrared in correlation with the light captured by the optical sensor due to the described bandpass filter. As each camera and LED light source are parallel to each other, as previously stated, they both have an angle of inclination within the range defined above, i.e. 40 degrees to 60 degrees, preferably an angle of inclination of 50 degrees, so that they are facing down and forward. The LED light source is located, for example, approximately 30 cm below or above its corresponding camera, and this distance can be modified as necessary. Alternatively, the light source can be located in the same camera cabinet. This enables the cameras to receive a higher light intensity and can be used with a small aperture setting to avoid blurring or motion blur at working speeds.

Figure 6:
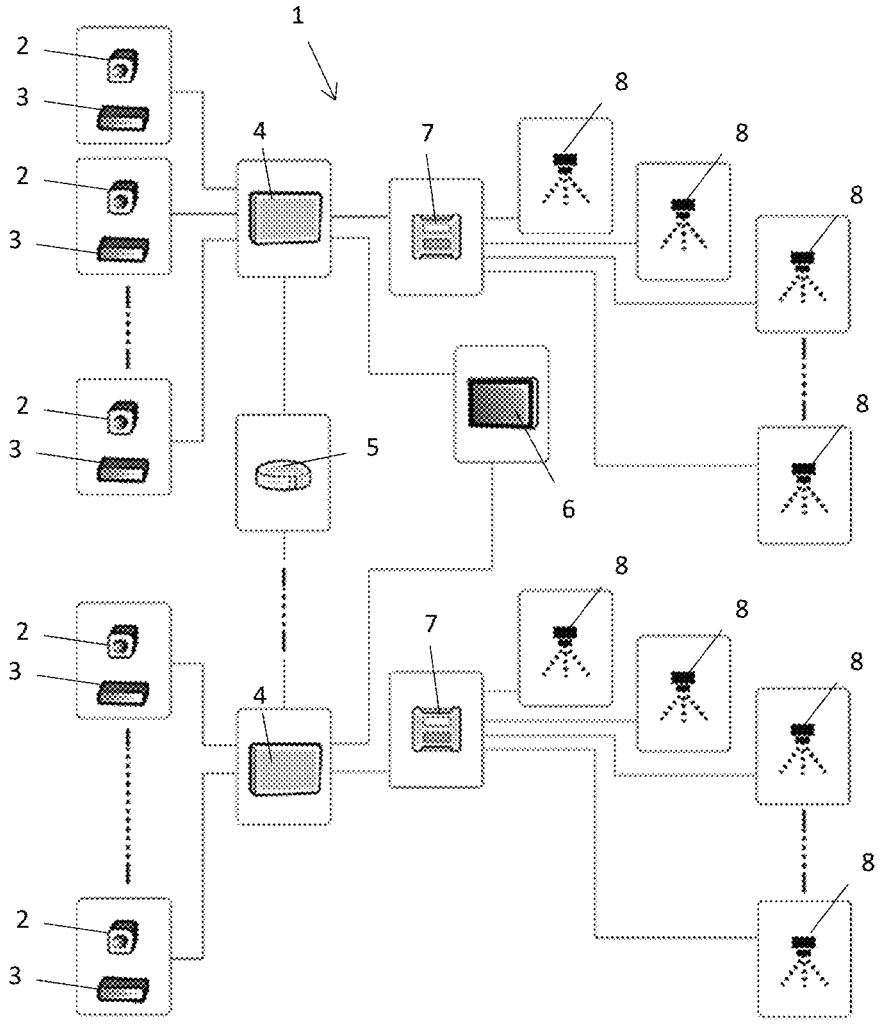
FIG. 6 shows a schematic image of an embodiment of the detection and identification system in data communication with spray valve controllers through the data processing units.
Figure 7A:
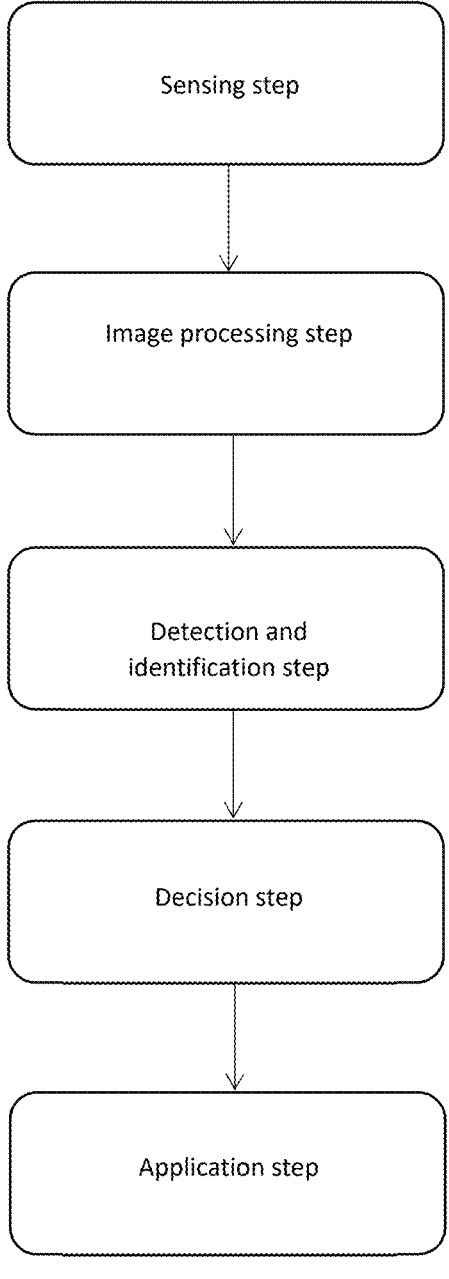
FIGS. 7A and 7B show respectively the steps of the method of the present invention and the modules responsible for carrying out each one of said steps.
Figure 7B:
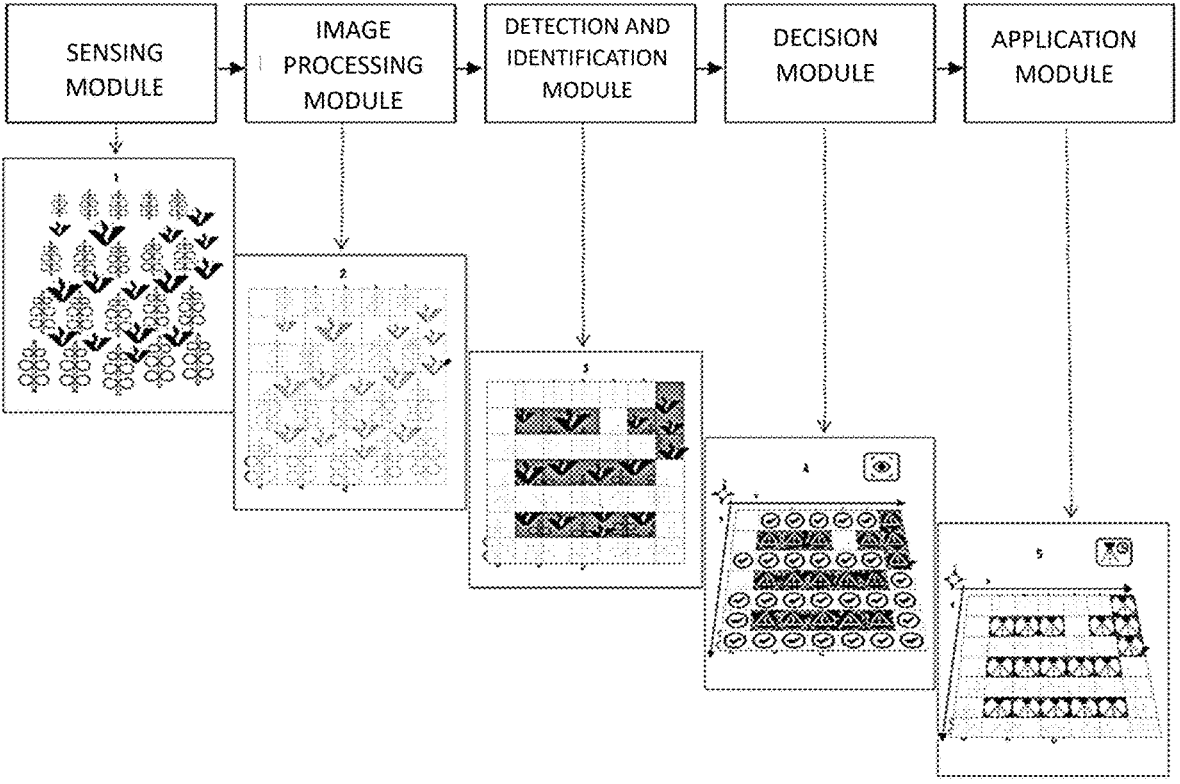

Referring to FIG. 6, in the case that the detection and identification system is implemented on either an agrochemical spraying vehicle, a trailed sprayer or an agrochemical spraying boom, said detection and identification system 1 may be in data communication with a spray valve controller 7 through a data processing unit 4 as seen in FIG. 7. In particular, said FIG. 7 shows a schematic image of an embodiment of the detection and identification system 1 of the present invention comprising more than one data processing unit 4, each data processing unit being in data communication with six cameras 2, six lighting sources 3 (for the sake of simplicity, FIG. 7 shows less than six cameras 2 and less than six light sources 3 for each data processing unit) and with a valve controller 7 that controls a certain number of spray valves 8. Likewise, each data processing unit 4 is in data communication with the same GPS unit 5 and the same user interface 6.

Each valve controller 7, by means of the corresponding data processing unit 4, is responsible for managing the opening and closing of each one of the spray valves 8 that are associated with said valve controller 7. In this way, the data processing unit 4 transmits commands to the valve controller 7 in order to allow a valve opening and closing logic for the application of agrochemicals. By way of example only, in the event that a spraying vehicle applies herbicides, the application of herbicides is carried out according to the position of the detected weeds, the movement of the spraying vehicle, the position of the valves relative thereto, the height of the valves and pressure to be used for spraying, among other possible variables to take into account.

As the data processing unit(s) 4 having the detection and identification system 1 are in data communication with the user interface 6, the operator of the spraying vehicle can interact with its own components, and linked to the, detection and identification system 1 of the present invention in order to carry out actions, adjustments and/or obtain information from them.

The detection and identification system of the present invention, in order to efficiently detect plant species, carries out a method for detecting and identifying plant species in an agricultural field that has steps that are described by way of example and that they can be replaced by others that produce the same or similar effects. This method is carried out through the algorithms present in the data processing unit which can be separated into different modules. Next, the steps of the method are described, which is illustrated in a simplified way in FIG. 7A, together with the modules responsible for carrying out these steps, which are illustrated schematically in FIG. 7B together with an image by way of example of the function they carry out.

The first step or sensing step, which is performed by a sensing module, captures an image or frame of the soil that may contain live or dead plant species through a camera and receives data from the GPS unit and from the inertial measurement units that each camera can count on. Likewise, in this step the necessary configurations are carried out, in real time and iteratively, such as exposure calibration, white balance, etc., using the camera's self-calibration system and, therefore, the algorithms calibration of the calibration system of the data processing unit, so that each camera obtains the best possible image quality for the detection of plant species. That is, the sensing module performs an image calibration in terms of exposure values, gain, white balance, among other parameters.

The exposures and gains with which the image is captured are adapted with the aim of normalizing the illumination in the image of each camera to be able to analyze certain details independently of the existence of shadows and ambient lighting in different weather situations. Given the use of the filter mentioned above, to highlight the contrast between plant species and other elements present in a plot for agricultural use and the need to observe details in sectors of the image that could be obscured by shadows, a lens of calibration different from that normally used by general-purpose cameras. Therefore, the exposure and gain parameters are adjusted to special values that allow achieving an optimal image in terms of contrast between plant species and other elements and definition of detail in all types of lighting, both in areas with less lighting due to shadows that could to be projected on the ground as in sectors of great lighting.

Cameras used, for example high dynamic range cameras, by capturing three images taken with different exposure values generate a single image, which uses more information from the image with higher exposure in dark parts of the scene and more image information with less exposure in brighter sectors of the scene. This resulting composition is performed by each of the high dynamic range cameras, thus saving processing resources for the data processing unit which receives already processed images. Exposure maximums are established to avoid a blurred image when taking it with the vehicle circulating at its maximum use speed.

The second step or image processing step, which is performed by an image processing module, is responsible for making any type of subsequent correction necessary to image capture, such as anti-distortion, calculation of Normalized Difference Vegetation Index (NDVI) depending on the application to be made and separate the image into patches or rectangular or square portions. The latter means that the image or frame obtained is divided into a grid of smaller frames.

The third step or step of detection and identification, which is performed by the detection and identification module, is responsible for detecting and identifying the content of each patch using deep learning algorithms. More precisely, by means of convolutional neural networks, which are trained with a database that contains patches or frames of the size obtained in the previous step, where said patches or frames comprise plant species and soils captured in different conditions under which the system could be used. Said plant species in the patches of the database can correspond to a considerable number of plant species, although they do not necessarily have to include all the plant species present in the agricultural field where it is desired to use the detection and identification system of the present invention. Likewise, these patches or frames of each plant species that may be found in the soil can be expanded with data augmentation techniques. In turn, each patch is classified as containing weeds or not, containing crops or not, plant species to be exterminated or no plant species, among other possible combinations. In this way, convolutional neural networks identify the content of the images that are presented to them in real time during the agricultural application being carried out. This is achieved by filtering only the patches that have a high probability of containing the plant species that you want to detect.

The data augmentation techniques used consist of changes that are made on the images to produce new images from them and thus increase the amount of data without the need to capture other images. Changes in the original images occur randomly, but with restrictions that make the new images obtained represent situations that could occur in reality, for example, rotations of the original images are made at small angles, effects that would simulate blurring, etc. On the other hand, the manual data augmentation of the images in the database is also carried out, also seeking to resemble situations that could occur in reality. For example, the gain is modified to obtain lighter/darker images.

Figure 8:
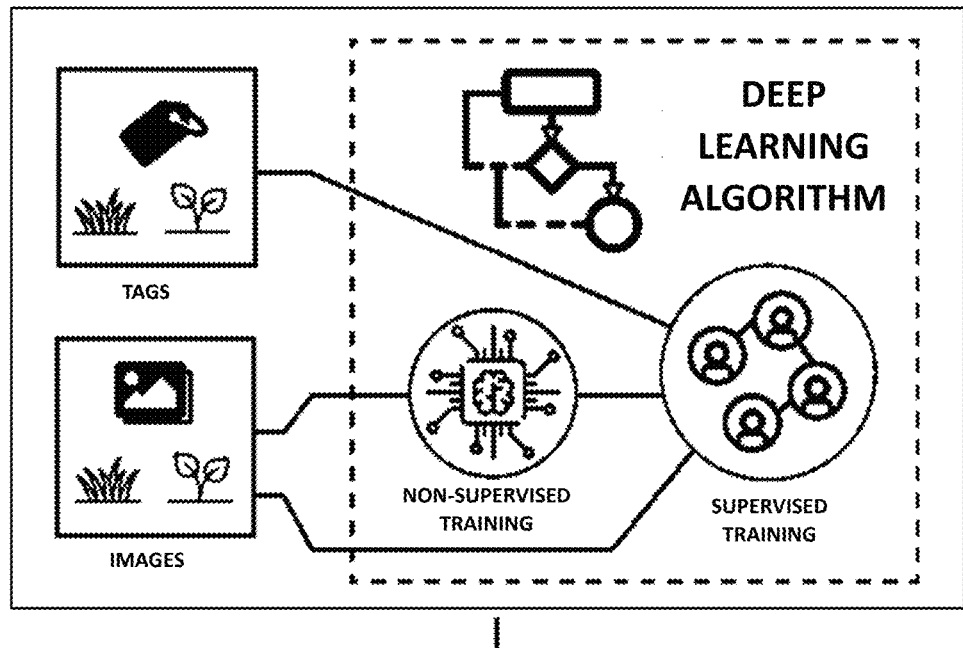
FIG. 8 schematically shows the steps performed by deep learning algorithms in the detection and identification system of the present invention.
Figure 8:
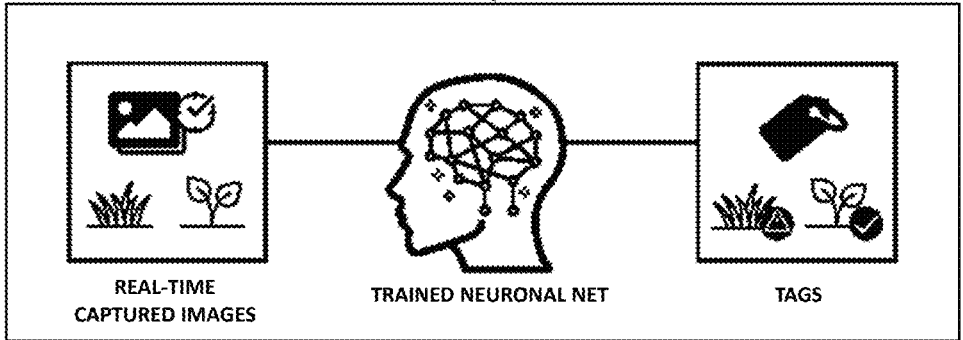

Furthermore, for the use of the detection and identification system of the present invention to detect and distinguish plant species in an agricultural field in, for example, an agricultural vehicle using said detection and identification system, a step of training of convolutional neural networks, that is, of deep learning algorithms, which consists of two parts, a first part of unsupervised learning or training, and a second part of supervised learning or training, which will be explained below, and an identification or detection step in which the trained network identifies the content of the images presented to it in real time during the selected agricultural application, see FIG. 8. It should be noted that the training step is carried out prior to use of the detection and identification system of the present invention and the identification step is done while using such an application system.

In the training step, deep learning algorithms, in particular, convolutional neural networks, receive as input images of field sectors in various situations and use them to learn to classify any new image in the categories indicated. This implies that the network adjusts its parameters, called filters, which are the coefficients of the convolution matrices that will be applied on the input data to a certain layer of the network, in order to minimize any error function that is provided. It should be clarified that by categories it must be understood what type of crop is desired to be detected, what type of weed is desired to be detected, etc. For its part, the error function is a measure of the difference between the result obtained by the network for a given input data and a result established as valid or desirable. For example, in supervised training, the result considered valid or correct is the label that one skilled in plant species associated with a patch when classifying it as weed, soil, etc. The error function will have a lower value if the results obtained by the network and those considered valid or desirable coincide. Therefore, according to the value produced by the error function, an adjustment will be made on the network filters in an iterative process. These concepts apply to both supervised and unsupervised training.

Likewise, it is necessary to clarify that the detection and identification system of the present invention can be configured to detect and identify different types of plant species, but in order to save on processing resources and for practical agricultural purposes, the detection and identification system can be configured to detect and identify, for example, the crop of interest and/or weeds that may be present in the agricultural field of interest. Also, these weeds can be differentiated between grasses or leaf weeds.

First, generative adversary networks (GANs) are used in unsupervised training that allow the data processing unit of the detection and identification system of the present invention to learn relevant filters for classification in the selected categories. In this detection and identification system, what is detected in crop/weed/soil can be classified as broader categories and in subtypes of crops or weeds, given the possibility of obtaining a system for uses that require such precision of classification.

The generative adversary networks learning procedure consists of training at the same time a synthetic data generator and a discriminator that tries to discern if the data provided is real or synthetic. Thus, the generator should try to produce images as similar as possible to the ones provided and the discriminator, in the process of learning to discern between the generated (synthetic) and real images, will be able to train its filters (parameters) in order to identify properties of the image that are characteristic.

In particular, the learning process for generative adversary networks consists of providing generative adversary networks with a database of 64×64 pixel patches, extracted from images captured with the cameras and taken under various conditions in the agricultural environment in which the detection and identification system of the present invention will be used. The size selected to subdivide the images is determined so as the generative adversary network architecture achieves good training stability using that network input size (64×64). In turn, the patches are taken only from a rectangle in the lower center of an image, and, for this step, the inclusion of images containing crop and weeds is favored, as opposed to those containing only soil. This increases the probability that the patches contain plant species and that examples with good image quality will be used.

Given the described database, the detection and identification system repeats the unsupervised learning part during a determined number of iterations and the results obtained are evaluated. In the case of the discriminator, the evaluation is carried out by observing the progress of the error in the distinction between real and generated images. In the case of the generator, the evaluation is carried out by inspecting them. This procedure (providing the input images, performing the preset number of iterations, and evaluating the results) is performed again as many times as necessary until satisfactory results are obtained for a machine learning expert of the system of the present invention.

Figure 9:
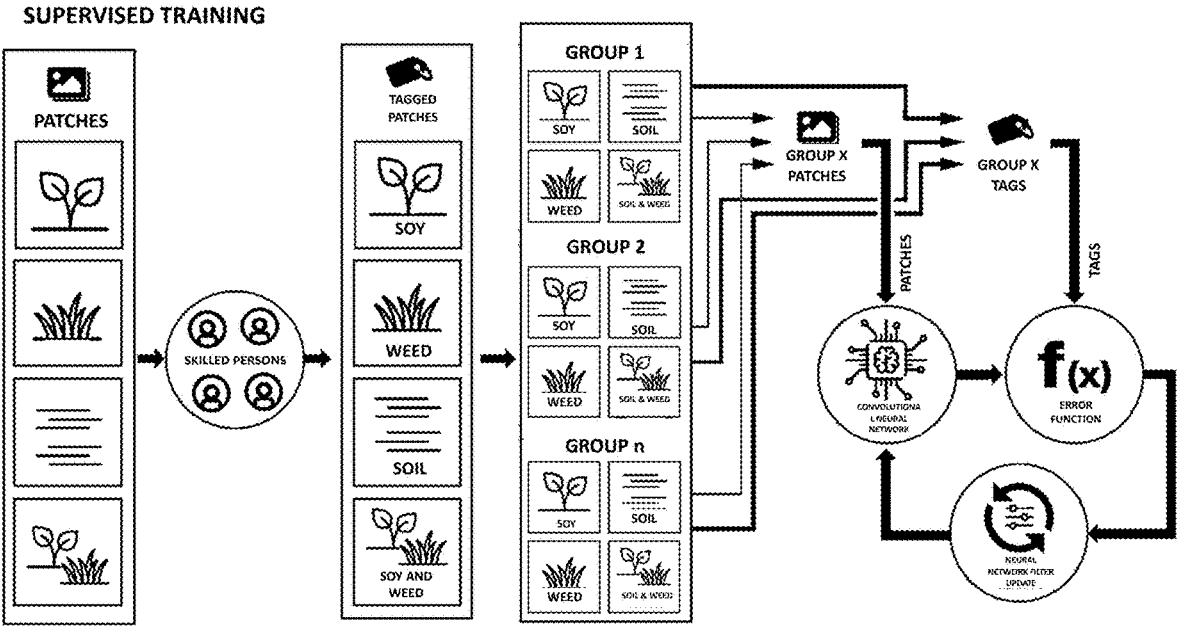
FIG. 9 shows a schematic block diagram representing the supervised training procedure.

Once the unsupervised training is completed, the supervised training is carried out, which is described below and which for its better understanding can be seen in FIG. 9 a schematic block diagram representing the supervised training procedure. For this instance, a subset of the 64×64 patch database extracted from captured images is used, this time without favoring any particular type of data, if not seeking to obtain the same number of examples of the different elements to be classified, in various environmental conditions. These patches are labeled by one skilled in the art according to the type of plant species, if any, that is observed in each patch of the image and if the same patch contains only soil, stubble, etc.

In turn, the trained discriminator is used in the unsupervised learning step and the learned filters are recovered to transfer them to a convolutional network format optimized to obtain better performance in time in the data processing unit, being that it has multiple cores and a graphics processing unit optimized for working with images.

With the 64×64 images and their respective labels plus the network obtained for the discriminator in the new format, a knowledge transfer is performed as follows: an error function is calculated using the filters that trained the generative adversaries networks in unsupervised learning about tagged images. From there, the training of three different networks continues with tagged data in order to optimize this error. The networks used are 3 and 2 layers only, being in this way simple networks.

It should be clarified that the layers of a convolutional neural network are made up of filter sets. These filters are the coefficients of the convolution matrices to be applied to its inputs. A network can have multiple layers that are applied one after the other, so that the data transformed by one layer becomes the input of the next layer, which will transform it again. The training of a neural network consists precisely in determining these filters so that, given a given input data, the successive transformations result in the desired output. For example, when dealing with a patch containing a weed, the well-trained neural network will apply transformations on said patch until it is classified as a weed.

On the other hand, the term "epoch" should be understood as a training period or cycle of a network in which said network receives each of the training data once. For example, if in total M×N training data (images) will be used, these would be delivered to the network in N groups of M data (images) each. For each group of M data, the network classifies them. With this classification result plus the labels associated with the data, where said labels are added by a user before the start of the training, a cost function is computed. With this cost, the network is fed back and its filters are updated. Then another set of M data is delivered to the updated network and the procedure is repeated. At the end of the procedure with group N, the network has received each of the training data once and an epoch ends. Total training of the convolutional neural network consists of performing several of these training epochs, for example, an "n" number of times.

Figure 10:
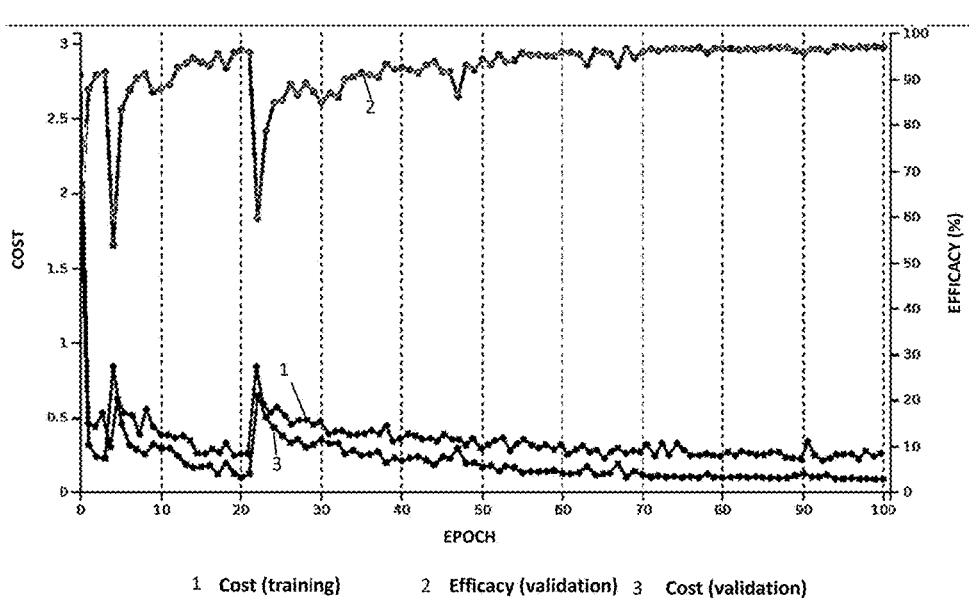
FIG. 10 shows a graph in which the precision and the error evolve as a function of the training times in a convolutional network.

FIG. 10 shows a graph showing how the convolutional network evolves through training epochs, in particular, how precision and error evolve as a function of training epochs. More precisely, it is observed how the evolution of the error function, indicated in the graph as training cost, decreases with training epochs. Since the network training could be stopped at any of the epochs and the convolutional network obtained at that epoch where the training was stopped could be used to classify images, the graph also shows the function of error and precision calculated on a set of validation data that was classified with the resulting network of each epoch.

This graph illustrates how an epoch can be selected to stop the training given the evolution of the error and the precision obtained.

Additionally, as previously mentioned, robustness is added to the data using data augmentation techniques. For this, taking into account that the described procedure is repeated "n" times, in certain point iterations selected randomly by the algorithm, instead of delivering the captured images as input, versions of the same are delivered with small modifications introduced in a way probabilistic. In other words, the algorithm randomly selects some groups of M patches from among the N groups that are delivered to the network during a training epoch and instead of delivering those M patches as they were captured by a corresponding camera, it delivers them with minor modifications. Thus, some variation is introduced in the data or patches so that the network must adjust its filters if it cannot correctly classify these modified data or patches. The modifications that are used are noise with a Gaussian probability distribution and rotations in angles with a certain degree of randomness, since they generate images that could occur in the actual captures. In this way, these modifications allow the introduction of variety in the training data to prevent the network from over-adjusting itself. In this instance, the detection and identification system receives the 64×64 patches corresponding to a new image and delivers them to the already trained network to identify their content.

It is necessary to emphasize that by means of 2-layer and 3-layer networks, results are obtained that are comparable with the results obtained using much more complex networks, which would have a worse performance of time in training because training would take longer and even worse during prediction because it takes longer for all layers to process the data.

On the other hand, manual data augmentation is also used, which allows controlled changes to be made to the data, with the same objective of adding robustness to the system. The database used increases through rotations, changes in white balance, gain, generating data similar to those that could naturally occur in the environment of use of the detection and identification system.

For its part, the identification step occurs during the use of the detection and identification system for a certain required application. In this instance, the detection and identification system receives a new image, subdivides it into 64×64 patches and delivers each of the patches to the network already trained to identify their content.

The fourth step or decision step, which is carried out by a decision module, is responsible for geolocating each patch and the plant species that exist, using the geolocation algorithms, taking into account that the cameras are they are calibrated in terms of their intrinsic and extrinsic parameters, as previously mentioned, in relation to the GPS unit. Then, the decision module makes a decision taking into account various adjustment factors that include, for example, the evaluation carried out in the third step by the detection and identification module on each patch, the type of spraying that is desired (on fallow or crop); the degree of certainty in spraying vs. the degree of savings in agrochemicals selected by the user. Said decision-making corresponds to generating a requirement to act on some or all of the plant species detected based on the agricultural task being carried out.

The fifth and last step or application step, which is carried out by an application module, is responsible for determining at what moment and for how long each valve (or actuator) must act to carry out the action required in the specified position on any of the detected plant species. The application module contrasts the application requirement determined by the fourth step with the environmental conditions to carry it out. Firstly, a radius is defined around the area of the patch to be sprayed (or buffer) that results from a configuration of the user and/or the characteristics of the spray to be carried out: type of product, speed of application, type of weeds to be treated, environmental conditions, etc. Based on the circulation speed and the geolocation of each actuator, the opening and closing moment of the valve(s) is determined to apply over the determined radius.

The detection and identification system also has a user interface, which was mentioned previously, which is in data communication with the entire detection and identification system and offers the possibility of configuring parameters such as security in spraying vs. product savings; buffer or radius around the plant species to be sprayed and other spraying requirements. In addition, through the user interface, it can intervene on the detection and identification, decision and application modules. Likewise, the user interface also offers, for example, a report that includes a detection map with the geolocation of plant species, the action taken (for example, the areas where the product was applied) and any other type of useful information so that the user can decide on future actions or generate a request for another device.

It should be noted that the cameras and inertial measurement units are calibrated with respect to the GPS unit mounted on the agricultural vehicle or component, for example a spray vehicle. In the case of inertial measurement units, an offset of position and alignment can be adjusted with respect to the image sensor of the camera attached to it. In turn, and as previously mentioned, the cameras are calibrated in terms of their intrinsic parameters (focal length of the camera, its center and its distortion coefficients) and its extrinsic parameters, which allow us to know its pose (position and angle) with respect to the spray nozzles and GPS unit.

Finally, it is necessary to emphasize that the detection and identification system and method of the present invention achieve highly efficient results regardless of whether they are applied to intensive or extensive crops and whether the environmental and soil conditions are friendly or hostile.

Referring again to FIG. 7B, each of the modules that carry out the method of the present invention can be seen along with an exemplary image of the function they perform. In particular, for the sensing module, the capture of an image containing crops and weeds is shown; for the image processing module, the same previous image is shown, which has been subdivided into patches; for the detection and identification module, the same image shown before the one that has detected and identified the patches containing the weeds or plant species of interest is shown; for the decision module the same previous image is shown where each patch has been geolocated and decided to act on the detected weeds or plant species; and for the application module, the same previous image is shown where it has been determined at what moment and for how long each valve (or actuator) must act to carry out the required action in the specified position on any of the weeds or species vegetables detected.

Results a high percentage of success and in this way there would be no weeds without spraying. The counterpart to this parameter is the false omission rate which shows what proportion of the patches classified as weed-free actually contain the same. It can be seen that the false omission rate is only 4% of patches classified as weed free, which is a highly acceptable value in practice.

Additionally, Table 2 presents the results in spraying agrochemicals. In this case, in addition to the deep learning algorithms, the process of weed geolocation and valve opening and closing is evaluated, since before physical plant species in a lot its correct pulverization is evaluated and the absence of pulverization where the species considered weeds (that is, those that are not crop) are not present.

TABLE 2

| | Efficacy | Sensitivity | Specificity | Precision | NPV - Negative predictive power | False Omission Rate |
|---|---|---|---|---|---|---|
| Weed spray on soybean crop | 85% | 90% | 80% | 82% | 89% | 11% |

Next, Table 1 is shown, which shows the performance of the detection and identification system in detecting and identifying weeds of different types within soybean crops. The values shown in Table 1 were obtained from the results of applying the deep learning algorithms based on convolutional neural networks and described above on images captured with the detection and identification system of the present invention. The algorithms classified each image patch as weed-containing or weed-free, and that detection was compared to the label given to the patch by one skilled in the art. That tag is assumed to be correct.

The detection and identification system of the present invention allows functions, results and advantages that are not obtainable by any device or method known in the art or by some obvious combination of devices or methods known in the art.

In particular, the detection and identification system allows, among some of its functions, to detect and identify plant species in a lot (which may or may not have a crop), geolocate them and take action on them, for example, spraying agrochemicals. Some advantages of the present invention compared to what is known in the state of the art are detailed below.

TABLE 1

| | Efficacy | Sensitivity | Specificity | Precision | NPV - Negative predictive power | False Omission Rate |
|---|---|---|---|---|---|---|
| Weed detection on soybean cultivation | 90% | 93% | 89% | 82% | 96% | 4% |

To analyze the performance of the detection and identification system of the present invention, the following parameters were considered: the efficacy that indicates what proportion of the detections (patch with weed and patch without weed) are correct; the sensitivity that indicates what proportion of the patches containing weeds are classified as such, this parameter being important because its high percentage of 93% shows that the cases in which it is necessary to spray are correctly detected; the specificity that indicates what proportion of the patches without weeds are classified as such; and the precision that indicates what proportion of the patches that are classified as containing weeds actually have the same, allowing this parameter to account for the use that will be made of the pulverized product.

On the other hand, the negative predictive power parameter indicates what proportion of the patches that are classified as weed-free really are, the value of 96% being of great importance because it shows that when the classifier determines that a patch does not has weeds, it does it with The use of cameras allows obtaining a more complete detector than that resulting from other types of sensors that can only identify the percentage of plant species within a measurement area. The cameras offer versatility to make a more specific detection, being able to distinguish weeds from the crop in the first place, essential for selective application. Second, it allows identifying the type or family of weeds and the species. Furthermore, camera detection allows the position of the plant species to be determined within the sensed area. The cameras can be used to geolocate the detected plant species, allowing generating a map thereof in addition to performing an action based on detection. A level of detail about the species detected can be provided, the system being able to identify them, their stages and other information of interest that can be represented, for example, through the user interface. In this way, a complete report is offered to the user that will serve for decision making or to generate a requirement for future actions.

In the detection and identification system, each camera detects plant species in a portion of the working width covered by several actuators that could be spray nozzles, and one camera per actuator is not required. In turn, a processing unit is responsible for controlling several cameras. The detection and identification system is versatile in costs for the user as it can vary the number of cameras and processing units according to the minimum precision to be achieved.

For its part, the use of a bandpass filter in each camera to improve the contrast between plant species and other elements that may be present in the environment of use of the detection and identification system, such as soil or fallow, facilitates classification.

Deep learning algorithms use patch labeling and subsequent classification of their content using the trained convolutional neural network. In particular, with reference to document US 2018/0330166 A1, the detection and identification system of the present invention is more efficient than the detection model described in said document since it does not make use of boundary boxes before classifying its content.

Furthermore, the structure of the selected network is of few layers resulting in a simple network, with a smaller amount of data necessary for its training than in the case of a more complex network. A smaller amount of training data makes the network easily adaptable to new conditions and that the detection and identification system that uses it is more economical because it requires less time to label data. At the same time, training and classification times are shorter with these networks. It is thus obtained an advantage in cost and speed without losing effectiveness.

The detection and identification system through the user interface allows the configuration of parameters such as spray safety vs. product savings, a "buffer" or radius around the plant species to be sprayed, etc. It also offers a detection report with details of the position of the detected species and the action taken.

Finally, as it has been shown through the results in the tables shown above, the detection and identification system of the present invention allows a high degree of certainty in the detection of plant species and in the application of product on the same.

Unless defined otherwise, all technical and scientific terms used herein have the same meaning as commonly understood by a person skilled in the art to which the invention belongs. All patents, applications, published applications and other publications referenced herein are incorporated by reference in their entirety to disclose and describe the methods and/or devices in connection with which the publications are cited.

Those skilled in the art will recognize or be able to determine, using only routine experimentation, many equivalents of the specific procedures, embodiments, claims and examples described herein. Such equivalents are considered to be within the scope of the present invention and covered by the appended claims.

The invention claimed is:

1. A detection and identification system for detecting and identifying plant species in an agricultural field that allows acting on them, comprising:

at least one camera comprising a lens, a bandpass filter for allowing wavelengths between 620 nm and 660 nm, and between 780 nm and 900 nm and an image sensor having a dynamic range of at least 60 dB placed after the bandpass filter, wherein each of the at least one camera is positioned at a height between 50 cm and 180 cm with respect to the ground, and wherein each of the at least one camera has an angle of inclination between 40 and 60 degrees towards the ground and forward, and wherein the image sensor of each of the at least one camera allows images with a wide aspect ratio to be captured;

an inertial measurement unit for each of the at least one camera, wherein each inertial measurement unit is rigidly attached to a respective camera;

a lighting source for each of the at least one camera, wherein each lighting source is positioned parallel to a respective camera;

a GPS receiver; and at least one data processing unit comprising at least one processor and memory storing instructions, wherein each of the at least one data processing unit is in data communication with the at least one camera, the inertial measurement unit and lighting source of each camera, and with the GPS receiver, wherein each of the at least one data processing unit comprises a camera calibration system for calibrating each of the at least one camera in terms of intrinsic and extrinsic parameters, wherein each of the at least one camera captures and sends filtered images of the agricultural field to the at least one data processing unit, wherein each of the at least one data processing unit is configured to:

correct an image using data from the inertial measurement unit, calculate a Normalized Difference Vegetation Index (NDVI) and subsequently separate the filtered image into patches so as to divide the image into a smaller size frame grid, and autonomously detect and identify plant species in each portion of the image using convolutional neural networks trained with a database containing images corresponding to the patches into which the filtered images were separated, discriminating between crops, weeds and soil, based on the images it receives, wherein the training of the deep learning algorithms includes data augmentation techniques, wherein only the patches that have a probability exceeding a predetermined threshold of containing the plant species to be detected are retained and used for decision-making, according to what is detected and identified, wherein each of the at least one data processing unit geolocates the detected plant species in each portion of the image, thereby allowing to generate weed and crop maps for each portion of the image that can be multi-layered, and wherein each of the at least one data processing unit is in data communication with a valve controller so as to independently drive a set of spray valves, each valve covering a portion of the agricultural field corresponding to the portion of the image.

2. The detection and identification system according to claim 1, wherein the system comprises at least two cameras, wherein each of the at least two cameras is positioned at a height of 140 cm with respect to the ground, and wherein each of the at least two cameras has an angle of inclination of 50 degrees towards the ground and forward.

3. The detection and identification system according to claim 1, wherein each of the at least one camera is a high dynamic range camera having an image sensor with a dynamic range of 120 dB.

4. The detection and identification system according to claim 1, wherein the system is mounted on an agricultural vehicle.

5. The detection and identification system according to claim 4, wherein the agricultural vehicle is selected from an agrochemical spraying vehicle, a vehicle that pulls a trailed sprayer or an electric robot for agricultural operations.

6. The detection and identification system according to claim 1, wherein the system is mounted on a spray boom.

7. The detection and identification system according to claim 1, wherein each of the at least one camera is positioned at a height between 80 cm and 160 cm with respect to the ground.

8. The detection and identification system according to claim 1, wherein each of the at least one camera has an angle of inclination of 50 degrees towards the ground and forward.

9. The detection and identification system according to claim 1, wherein the system comprises at least two cameras spaced from each other between 0.5 m and 5 m.

10. A detection and identification method that uses the detection and identification system of plant species according to claim 1 to detect and identify plant species in an agricultural field, comprising the following steps:

a sensing step, wherein an image or frame of the soil that can contain living or dead plant species is captured by a camera and filtered by a bandpass filter allowing wavelengths between 620 nm and 660 nm, and between 780 nm and 900 nm, and wherein a data processing unit comprising at least one processor and memory storing instructions receives data from the GPS receiver and the inertial measurement unit of said camera, and carries out configurations in real time and iteratively to each camera through the calibration system;

an image processing step, wherein the data processing unit performs any type of subsequent correction necessary to the captured image, calculates a Normalized Difference Vegetation Index (NDVI), and separates the image into patches or rectangular patches so as to divide the image into a grid of smaller frames;

a detection and identification step, wherein the content of each patch is detected and identified by the data processing unit which employs deep learning algorithms comprising convolutional neural networks that are trained with a database that contains patches comprising plant species and soil, said patches being of the same size as the patches of the previous step, wherein the content of each of the patches of the database is labeled, wherein the patches of the database are obtained from images captured by cameras under various conditions in the agricultural environment and from modified images that present changes with respect to said images captured, wherein the training of the deep learning algorithms allows the deep learning algorithms of the data processing unit to have filters to detect and identify plant species, wherein the training of the deep learning algorithms includes data augmentation techniques, and wherein only the patches that have a probability exceeding a predetermined threshold of containing the plant species to be detected are filtered;

a decision step, wherein the plant species detected and identified in the previous step are geolocated through the data processing unit and weed and crop maps for each portion of the image that can be multi-layered are generated, wherein each of the at least one data processing unit sends data to a valve controller so as to independently drive a set of spray valves, each valve covering a portion of the agricultural field corresponding to the portion of the image, and wherein decisions are made regarding the way to act on said detected plant species, and—an application step, wherein the data processing unit determines when, where and for how long each valve must act to carry out an action with respect to the detected and identified plant species, and carries out said action.

\* \* \* \* \*